United States Patent
Deguchi et al.

(10) Patent No.: US 12,553,958 B2
(45) Date of Patent: Feb. 17, 2026

(54) DIAMOND MAGNETO-OPTICAL SENSOR AND DIAMOND MAGNETO-OPTICAL SENSOR SYSTEM

(71) Applicant: SUMITOMO ELECTRIC INDUSTRIES, LTD., Osaka (JP)

(72) Inventors: Hiroshige Deguchi, Kyoto (JP); Natsuo Tatsumi, Kyoto (JP); Tsukasa Hayashi, Kyoto (JP); Yoshiki Nishibayashi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 128 days.

(21) Appl. No.: 18/284,089

(22) PCT Filed: Mar. 29, 2022

(86) PCT No.: PCT/JP2022/015395
§ 371 (c)(1),
(2) Date: Sep. 26, 2023

(87) PCT Pub. No.: WO2022/210697
PCT Pub. Date: Oct. 6, 2022

(65) Prior Publication Data
US 2024/0159845 A1 May 16, 2024

(30) Foreign Application Priority Data
Mar. 31, 2021 (JP) .................. 2021-059797

(51) Int. Cl.
*G01R 33/032* (2006.01)
(52) U.S. Cl.
CPC .................. *G01R 33/032* (2013.01)

(58) Field of Classification Search
CPC ..... G01R 33/032; G01R 33/323; G01N 24/10
USPC ....................................... 324/244.1
See application file for complete search history.

(56) References Cited

U.S. PATENT DOCUMENTS

| | | | |
|---|---|---|---|
| 9,749,044 B1 | 8/2017 | Tiecke et al. | |
| 10,705,163 B2* | 7/2020 | Barry | G01N 24/12 |
| 2013/0056458 A1 | 3/2013 | Yun et al. | |
| 2017/0212187 A1* | 7/2017 | Hahn | G01R 33/032 |

(Continued)

FOREIGN PATENT DOCUMENTS

| | | |
|---|---|---|
| CN | 101488753 A | 7/2009 |
| CN | 101656537 A | 2/2010 |

(Continued)

OTHER PUBLICATIONS

Translation of JP 2016225817A (Year: 2016).*

(Continued)

*Primary Examiner* — Christopher P Mcandrew
(74) *Attorney, Agent, or Firm* — Renner, Otto, Boisselle & Sklar, LLP

(57) ABSTRACT

A diamond magneto-optical sensor includes: a diamond that includes a color center with an electronic spin and is irradiated with excitation light, and an irradiation unit that irradiates the diamond with the excitation light of the color center and electromagnetic waves for magnetic resonance, wherein the irradiation unit receives modulated light having been subjected to amplitude modulation, and a modulation frequency of the modulated light is included in a microwave frequency band.

21 Claims, 8 Drawing Sheets

(56) References Cited

U.S. PATENT DOCUMENTS

| | | | |
|---|---|---|---|
| 2017/0363696 A1* | 12/2017 | Hahn | G01R 33/0023 |
| 2018/0275211 A1* | 9/2018 | Hahn | G01R 33/0047 |
| 2018/0275225 A1* | 9/2018 | Hahn | G01R 33/26 |
| 2019/0018091 A1* | 1/2019 | Lew | G01R 33/26 |
| 2019/0219645 A1* | 7/2019 | Hahn | G01R 33/26 |
| 2019/0285706 A1* | 9/2019 | Sekelsky | G01R 33/032 |

FOREIGN PATENT DOCUMENTS

| | | | |
|---|---|---|---|
| JP | 2002-511204 A | | 4/2002 |
| JP | 2016225817 A | * | 12/2016 |
| WO | 98/35328 A2 | | 8/1998 |

OTHER PUBLICATIONS

Yuan, Z. L., et al. "Directly phase-modulated light source." Physical Review X 6.3 (2016): 031044. (Year: 2016).*

Acosta, Victor M., et al. "Electromagnetically Induced Transparency in a Diamond Spin Ensemble Enables<? format?> All-Optical Electromagnetic Field Sensing." Physical review letters 110.21 (2013): 213605. (Year: 2013).*

Sharma, Sarvagya, Chris Hovde, and Douglas H. Beck. "Diamond-based field sensor for nEDM experiment." Quantum Sensing and Nano Electronics and Photonics XIII. vol. 9755. SPIE, 2016. (Year: 2016).*

Acosta, V. M. et al., "Electromagnetically Induced Transparency in a Diamond Spin Ensemble Enables All-Optical Electromagnetic Field Sensing", Physical Review Letters, May 22, 2013, 6 pages, vol. 110, No. 21.

Lecocq, F. et al., "Control and readout of a superconducting qubit using a photonic link", ARXIV. Org, Cornell University library, Sep. 2, 2020, 13 pages.

Schäfer-Nolte, Eike Oliver, Development of a Diamond-based Scanning Probe Spin Sensor Operating at Low Temperature in Ultra High Vacuum, May 28, 2014, 145 pages.

International Search Report for corresponding Application No. PCT/JP2022/015395, mailed Jun. 21, 2022.

Sharma, Sarvagya. Hovde, Chris. Beck, Douglas. Diamond-based field sensor for nEDM experiment. Proceedings of SPIE 9755. Quantum Sensing and Nano Electronics and Photonics XIII. 97552U. Feb. 13, 2016, DOI: 10.1117/12.2211910 in particular, section "3.2 EIT Experiment", fig. 7.

Santori, Charles. Tamarat, Philippe. Neumann, Philipp. Wrachtrup. Joerg. Fattal, David. Beausoleil, Raymond G. Rabeau, James. Olivero, Paolo. Greentree, Andrew D. Pra Wer, Steven. Jelezko, Fedor. Hemmer, Philip. Coherent Population Trapping of Single Spins in Diamond under Optical Excitation. Physical Review Letters. Dec. 15, 2006, vol. 97, No. 24, pp. 247401-1 to 247401-4, DOI:https://doi.org/1 0.1103/PhysRevLett.97.247401 entire text.

Santori, Charles. Tamarat, Philippe. Neumann, Philipp. Wrachtrup. Joerg. Fattal, David. Beausoleil, Raymond G. Rabeau, James. Olivero, Paolo. Greentree, Andrew D. Pra Wer, Steven. Jelezko, Fedor. Hemmer, Philip. Coherent Population Trapping of Single Spins in Diamond under Optical Excitation. Physical Review Letters. Dec. 15, 2006, vol. 97, No. 24, pp. 247401-1 to 247401-4, DOI:https://doi.org/1 0.1103/PhysRevLett.97.247401 entire text.

Yuta Masuyama, Yuji Hatano, Takayuki Iwasaki, Mutsuko Hatano, "Highly sensitive macro-scale diamond magnetometer operated with coplanar waveguide resonator", the 79th JSAP Autumn Meeting Extended Abstracts (issued on Sep. 5, 2018) (cited in specification).

Zuo, Yikang et al. "Synthetic Diamond for Nitrogen Vacancy Sensor and Its Applicability" Jan. 2021, No. 198, pp. 67-72, [retrieval date Jun. 8, 2022] .< URL: https://sei.co.jp/technology/tr/bn 198/pdf/ 198-14.pdf> (Sumitomo Elec Tech Rev. Apr. 2021, No. 92, pp. 73-78, [retrieved on Jun. 8, 2022], <URL: https://sumitomoelectric. com/sites/ default/files/2021-04/download_documents/E92-14. pdf>, sections "5-1 Pencil Module", "5-2 Antenna Module", picture 5, fig. 3 (see ISR, Application No. PCT/JP2022/015395, Jun. 21, 2022, for concise explanation of relevance)).

* cited by examiner

DIAMOND MAGNETO-OPTICAL SENSOR AND DIAMOND MAGNETO-OPTICAL SENSOR SYSTEM

TECHNICAL FIELD

The present disclosure relates to a diamond magneto-optical sensor and a diamond magneto-optical sensor system. The present application claims priority under Japanese Patent Application No. 2021/059797 filed on Mar. 31, 2021, which is incorporated herein by reference.

BACKGROUND ART

A magneto-optical sensor using the center of NV (hereinafter referred to as a NV center) in diamond is known. When nitrogen at a substitution position of carbon in diamond and an NV center having a vacancy next to the nitrogen are negatively charged, the ground state becomes a triplet state (that is, a spin S=1). The NV center excited at a wavelength 532 nm (that is, green light) emits fluorescence at a wavelength 637 nm (that is, red light). The radiant intensity of fluorescence changes according to a spin state. The spin state is changed by magnetic resonance occurring due to a magnetic field applied to the NV center and microwaves or radio waves, which is applicable to a diamond magneto-optical sensor.

A diamond magneto-optical sensor includes a diamond substrate containing an NV center, an optical system that transmits excitation light from a light source and emits the light to the NV center, an optical system that condenses fluorescence from the NV center and transmits the fluorescence to a photodetector, and a waveguide that transmits microwaves from a power supply and emits the microwaves to the NV center.

For example, NPL 1 discloses a configuration for emitting microwaves with a diamond sensor placed on a coplanar waveguide. A diamond substrate is shaped like a rectangular solid. Excitation light is laterally emitted to the diamond substrate, and fluorescence is condensed from a position above the diamond substrate.

CITATION LIST

Non Patent Literature

NPL 1: "Highly sensitive macro-scale diamond magnetometer operated with coplanar waveguide resonator", Yuta Masuyama, Yuji Hatano, Takayuki Iwasaki, Mutsuko Hatano, the 79th JSAP Autumn Meeting Extended Abstracts (issued on Sep. 5, 2018)

SUMMARY OF INVENTION

A diamond magneto-optical sensor according to one aspect of the present disclosure includes: a diamond that includes a color center with an electronic spin and is irradiated with excitation light, and an irradiation unit that irradiates the diamond with electromagnetic waves for magnetic resonance, wherein the irradiation unit receives modulated light having been subjected to amplitude modulation, and a modulation frequency of the modulated light is included in a microwave frequency band.

A diamond magneto-optical sensor system according to another aspect of the present disclosure includes: the diamond magneto-optical sensor, a light modulation unit that generates modulated light, and a transmission unit that transmits the modulated light, wherein the modulated light is transmitted through the transmission unit and is received by the irradiation unit.

DETAILED DESCRIPTION

Figure 1:
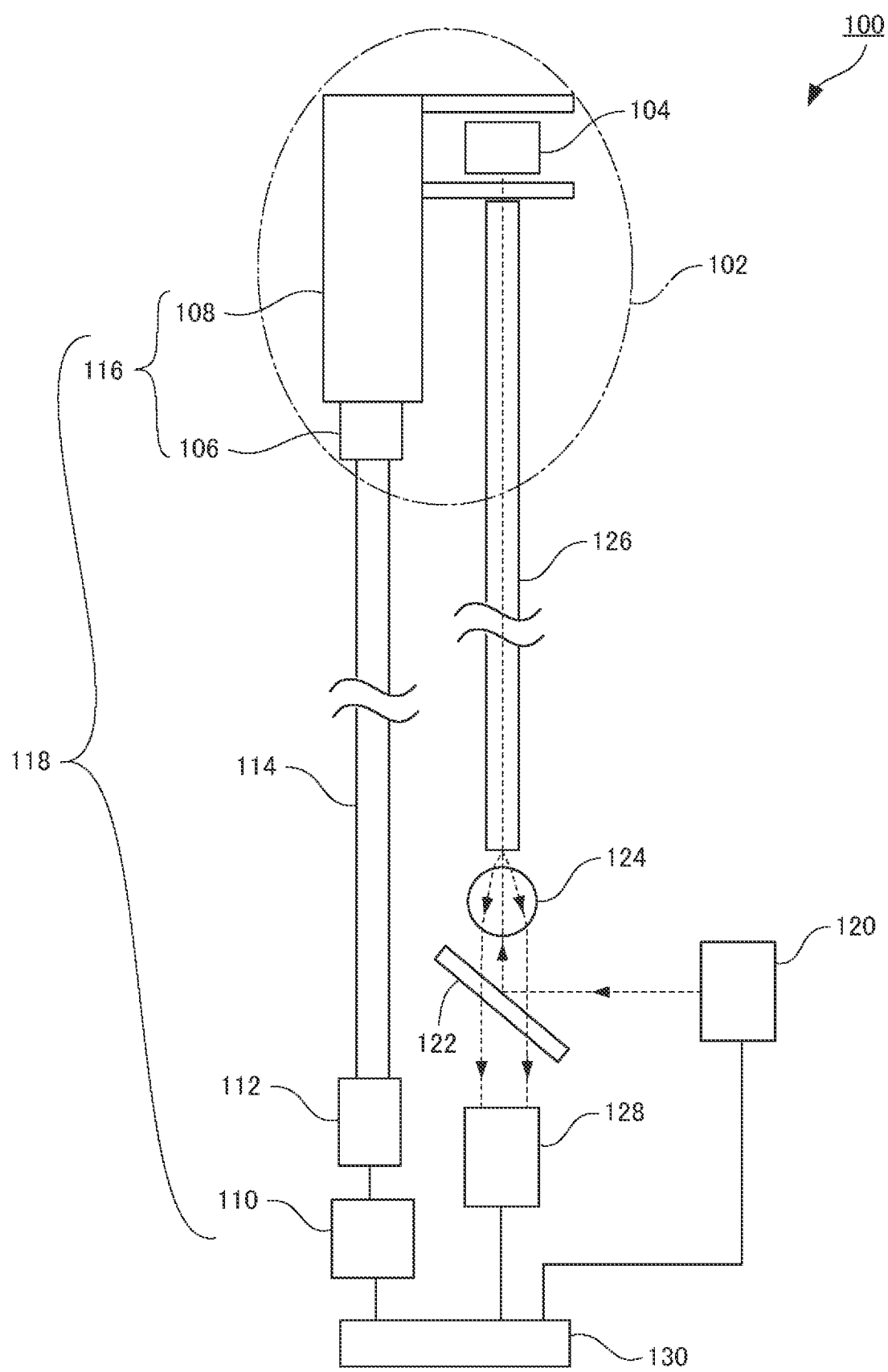
FIG. 1 is a block diagram illustrating a diamond magneto-optical sensor system according to an embodiment of the present disclosure.

Problem to be Solved by the Present Disclosure

If a diamond magneto-optical sensor is used for measurement in a high-voltage power unit, it is preferable to transmit excitation light, fluorescence, and microwaves while remotely ensuring electrical insulation to avoid a high-voltage electrical breakdown.

Excitation light and fluorescence can be transmitted through an optical fiber while remotely ensuring electrical insulation. For the transmission of microwaves through a coaxial cable, electrical insulation is hard to obtain. Spatial transmission by radio waves through a transmitting antenna and a receiving antenna can remotely ensure electrical insulation.

In the case of spatial transmission of microwaves through a transmitting antenna and a receiving antenna, microwaves for magnetic resonance of an NV center have a frequency of about 3 GHz and a wavelength of about 10 cm in a space. Thus, the receiving antenna needs to have a size of about 10 cm. Since the antenna is composed of an electric conductor, measurement in a high-voltage power unit requires consideration to ensure electrical insulation and avoid concentration of an electric field in order to prevent an electrical breakdown. However, the receiving antenna having a large size of 10 cm may cause difficulty in ensuring electrical insulation and avoiding concentration of an electric field. Moreover, the radiation of radio waves at about 3 GHz is limited according to the Radio Law. Such a restriction interferes with free and flexible measurement.

Thus, an object of the present disclosure is to provide a diamond magneto-optical sensor and a diamond magneto-optical sensor system that can be easily used for measurement in a high-voltage power unit.

Advantageous Effect of the Present Disclosure

The present disclosure can provide a diamond magneto-optical sensor and a diamond magneto-optical sensor system that can be easily used for measurement in a high-voltage power unit.

Description of Embodiment of the Present Disclosure

The contents of an embodiment of the present disclosure will be described in list form. At least parts of the embodiment below may be combined as required.

(1) A diamond magneto-optical sensor according to a first aspect of the present disclosure includes: a diamond that includes a color center with an electronic spin and is irradiated with excitation light, and an irradiation unit that irradiates the diamond with electromagnetic waves for magnetic resonance, wherein the irradiation unit receives modulated light having been subjected to amplitude modulation, and a modulation frequency of the modulated light is included in a microwave frequency band. This can implement a diamond magneto-optical sensor that can be easily used for measurement in a high-voltage power unit. Transmission paths for excitation light, microwaves and fluorescence that are transmitted between the diamond magneto-optical sensor and a measuring device can be all composed of nonmetallic members. Thus, in measurement in a high-voltage power unit, electric insulation for avoiding an electrical breakdown can be easily ensured, thereby improving the degree of freedom and flexibility of measurement.

(2) The irradiation unit can further include a photoelectric conversion unit that converts the modulated light into an electric signal, and the electromagnetic waves for magnetic resonance are formed by the electric signal generated by the photoelectric conversion unit and can be emitted to the diamond. Since electromagnetic waves (that is, microwaves) are not spatially transmitted using an antenna or the like, no restriction is imposed by the Radio Law. Thus, the measurement environment is not limited to the interior of a shield room, and measurement can be conducted in any environment.

(3) The photoelectric conversion unit may include a photodiode that converts the modulated light into the electric signal, the irradiation unit may further include a first bias tee that extracts an alternating-current component from the electric signal generated by the photodiode, and the electromagnetic waves for magnetic resonance may be formed by the alternating-current component. With this configuration, the diamond magneto-optical sensor can be compact as compared with the wavelength (that is, about 10 cm) of electromagnetic waves used for measurement and thus can be stored in a rounded case, for example, a spherical case. Thus, in measurement in a high-voltage power unit, concentration of an electric field can be easily avoided.

(4) The photoelectric conversion unit may include a photoelectric conversion element that converts part of light including at least one of projector light, modulated light, and excitation light into a potential, and the first bias tee may extract the alternating-current component from the electric signal by application of the potential generated by the photoelectric conversion element. With this configuration, an electrical insulation between the diamond and a light source and a microwave source can be obtained. Moreover, the life of the diamond magneto-optical sensor is extended.

(5) The photoelectric conversion unit may include a photoelectric conversion element that converts part of light including at least one of projector light, modulated light, and excitation light into power, and an amplifier that amplifies the output signal of the photodiode or the first bias tee, and the output signal may be amplified by applying the power generated by the photoelectric conversion element to the amplifier. With this configuration, an electrical insulation between the diamond and the light source and the microwave source is obtained, the diamond can be irradiated with microwaves of higher power, and magnetic detection can be performed with higher sensitivity. Moreover, the life of the diamond magneto-optical sensor is extended.

(6) The carrier wave of the modulated light may have a wavelength different from the wavelength of the excitation light. Thus, the modulated light and the excitation light can be easily transmitted through the same optical fiber and the number of components can be reduced.

(7) The carrier wave of the modulated light may have a wavelength included in the waveband of near infrared light. This facilitates the generation and transmission of the modulated light.

(8) The excitation light may have the same wavelength as the carrier wave of the modulated light, and the modulated light may be generated by amplitude-modulating the excitation light. Thus, only the excitation light needs to be generated, so that the number of components can be reduced (9) The modulated light may be a laser beam. Thus, the intensity of the modulated light can be increased, and the modulated light can be transmitted for a longer distance.

(10) The modulated light may be outputted from a laser diode by controlling the driving, current of the laser diode such that the driving current changes at a modulation frequency. Thus, modulated light can be easily generated by a direct modulation method, thereby downsizing a modulator.

(11) The modulated light may be outputted from an LN element by controlling the LN element by a modulating signal of the modulation frequency, the LN element receiving a laser beam. This enables high-speed modulation that generates modulated light at a high modulation frequency

(12) The driving current of the laser diode may be controlled by a second bias tee. Thus, the modulated light can be easily generated by using the laser diode.

(13) The excitation light may be a laser beam. Thus, the excitation light can be easily generated by using the laser diode.

(14) The modulated light may be transmitted through a first optical fiber and received by the irradiation unit. Thus, the modulated light can be reliably transmitted to the irradiation unit. Moreover, the diamond magneto-optical sensor can be safely used in a high-voltage power unit.

(15) The excitation light may be transmitted through a second optical fiber and emitted to the diamond. Thus, the excitation light can be reliably transmitted to the irradiation unit. Moreover, the diamond magneto-optical sensor can be safely used in a high-voltage power unit.

(16) The excitation light may be transmitted through the first optical fiber and emitted to the diamond. Thus, the modulated light and the excitation light can be transmitted through the single optical fiber, thereby facilitating manufacturing with a smaller number of components.

(17) The irradiation unit may include a resonator, and the diamond may be disposed on the resonator. This can efficiently irradiate the diamond with electromagnetic waves (that is, microwaves)

(18) The diamond may be disposed at a position within 5 mm from the photoelectric conversion unit. This can irradiate the diamond with high-power electromagnetic waves (that is, microwaves)

(19) The irradiation unit may irradiate the diamond with the inputted modulated light as the electromagnetic waves for magnetic resonance. This eliminates the need for a photoelectric conversion device for converting the modulated light into an electric signal, thereby facilitating manufacturing with a smaller number of components.

(20) The diamond magneto-optical sensor may further include a storage part formed in a smooth shape by a conductive member, and the diamond and the irradiation unit may be stored in the storage part. Thus, the diamond magneto-optical sensor can be safely used in a high-voltage power unit.

(21) A diamond magneto-optical sensor system according to a second aspect of the present disclosure includes: the diamond magneto-optical sensor, a light modulation unit that generates the modulated light, and a transmission unit that transmits the modulated light, wherein the modulated light is transmitted through the transmission unit and is received by the irradiation unit. With this configuration, transmission paths for excitation light, microwaves, and fluorescence that are transmitted between the diamond magneto-optical sensor and a measuring device can be all composed of nonmetallic members. Thus, in measurement in a high-voltage power unit, electric insulation for avoiding an electrical breakdown can be easily ensured, thereby improving the degree of freedom and flexibility of measurement. Since electromagnetic waves (that is, microwaves) are not spatially transmitted using an antenna or the like, no restriction is imposed by the Radio Law. Thus, the measurement environment is not limited to the interior of a shield room, and measurement can be conducted in any environment. Since microwaves are not spatially transmitted using an antenna or the like, no restriction is imposed by the Radio Law. Thus, the measurement environment is not limited to the interior of a shield room, and measurement can be conducted in any environment.

Detailed Description of Embodiments of the Present Disclosure

In the following embodiment, the same components are indicated by the same reference numerals. The same components have identical names and functions. Thus, a detailed explanation thereof is not repeated.

Referring to FIG. 1, a diamond magneto-optical sensor system 100 according to an embodiment of the present disclosure includes a diamond 104, a photoelectric conversion unit 106, a transmission unit 108, a modulating signal generation unit 110, a light modulation unit 112, an optical fiber 114, an excitation light generation unit 120, a branching filter 122, a condensing unit 124, an optical fiber 126, and a control unit 130. Diamond 104 includes an NV center Microwaves are supplied to diamond 104 by optical feeding. Diamond 104, photoelectric conversion unit 106, and transmission unit 108 constitute a diamond magneto-optical sensor. In the case of measurement in a high-voltage power unit or the like by diamond magneto-optical sensor system 100, it is preferable to store diamond 104, photoelectric conversion unit 106, and transmission unit 108 in a conductive case 102, which is made of a metal or the like, in order to avoid concentration of an electric field. Control unit 130 controls modulating signal generation unit 110 and excitation light generation unit 120 as will be described later, irradiates diamond 104 with microwaves and excitation light, detects fluorescence radiated from diamond 104 by means of a detection unit 128, and acquires the fluorescence as measurement data. Control unit 130 is implemented by a CPU (Central Processing Unit) or a microcomputer or the like.

Modulating signal generation unit 110 under the control of control unit 130 generates a signal of a predetermined frequency (that is, a microwave frequency band) and inputs the signal to light modulation unit 112. Light modulation unit 112 amplitude-modulates light of the predetermined frequency by using the signal supplied from modulating signal generation unit 110, and generates and outputs the modulated light. In other words, the signal output by the modulating signal generation unit 110 is a modulating signal that is used for generating modulated light. The frequency of the signal outputted by modulating signal generation unit 110 is a modulation frequency. The light to be modulated with the predetermined frequency is a carrier wave. The modulated light generated by light modulation unit 112 is transmitted to photoelectric conversion unit 106 through optical fiber 114.

Photoelectric conversion unit 106 converts, to an electric signal, the modulated light transmitted through optical fiber 114 (that is, photoelectric conversion) and inputs the electric signal to transmission unit 108. Thus, from the modulated light, the electric signal is generated with the frequency of the carrier wave (that is, a microwave frequency band) and is supplied to transmission unit 108. Transmission unit 108 intensifies the inputted electric signal, that is, a current and transmits the signal to diamond 104. Electromagnetic waves formed by the electric signal transmitted by transmission unit 108 are emitted to diamond 104 and are used for the magnetic resonance of the NV center. In other words, photoelectric conversion unit 106 and transmission unit 108 constitute an irradiation unit 116, and modulating signal generation unit 110, light modulation unit 112, optical fiber 114, and irradiation unit 116 constitute an optical feeding unit 118 for irradiating diamond 104 with microwaves.

Excitation light generation unit 120 under the control of control unit 130 generates the excitation light (that is, green light) of the NV center and outputs the excitation light. The excitation light generated by excitation light generation unit 120 is reflected by branching filter 122, is condensed by condensing unit 124, and enters optical fiber 126. Branching filter 122 reflects or transmits incident light according to the wavelength of the incident light. Branching filter 122 is, for example, a dichroic mirror that reflects green excitation light and transmits red fluorescence. Optical fiber 126 transmits inputted excitation light to diamond 104. Thus, excitation light is emitted to diamond 104 and fluorescence (that is, red light) is radiated from the NV center of diamond 104. Fluorescence radiated from diamond 104 enters optical fiber 126, is transmitted through optical fiber 126, and is radiated from the output end of optical fiber 126. Fluorescence radiated from the output end of optical fiber 126 is condensed into parallel rays through condensing unit 124, passes through branching filter 122, and enters detection unit 128 Detection unit 128 detects the intensity of incident fluorescence. Control unit 130 acquires a signal detected by detection unit 128, as measurement data. Thus, diamond magneto-optical sensor system 100 can measure a magnetic field or the like.

As described above, microwaves are emitted to diamond 104 by optical feeding in diamond magneto-optical sensor system 100. Specifically, referring to FIG. 2, microwaves to be emitted to diamond 104 are transmitted as light (that is, modulated light) to the vicinity of diamond 104 through optical fiber 114, and then the light is converted into an electric signal, which forms electromagnetic waves (that is, microwaves). Meanwhile, the excitation light of the NV center is outputted from excitation light veneration unit 120 and is transmitted to diamond 104 through optical fiber 126. Fluorescence radiated from the NV center is transmitted to detection unit 128 through optical fiber 126. By optical feeding, transmission paths for excitation light, microwaves, and fluorescence that are transmitted between the diamond magneto-optical sensor and a measuring device can be all composed of nonmetallic members (e.g., an optical fiber). Thus, in measurement in a high-voltage power unit, electric insulation for avoiding an electrical breakdown can be easily ensured, thereby improving the degree of freedom and flexibility of measurement.

Figure 3:
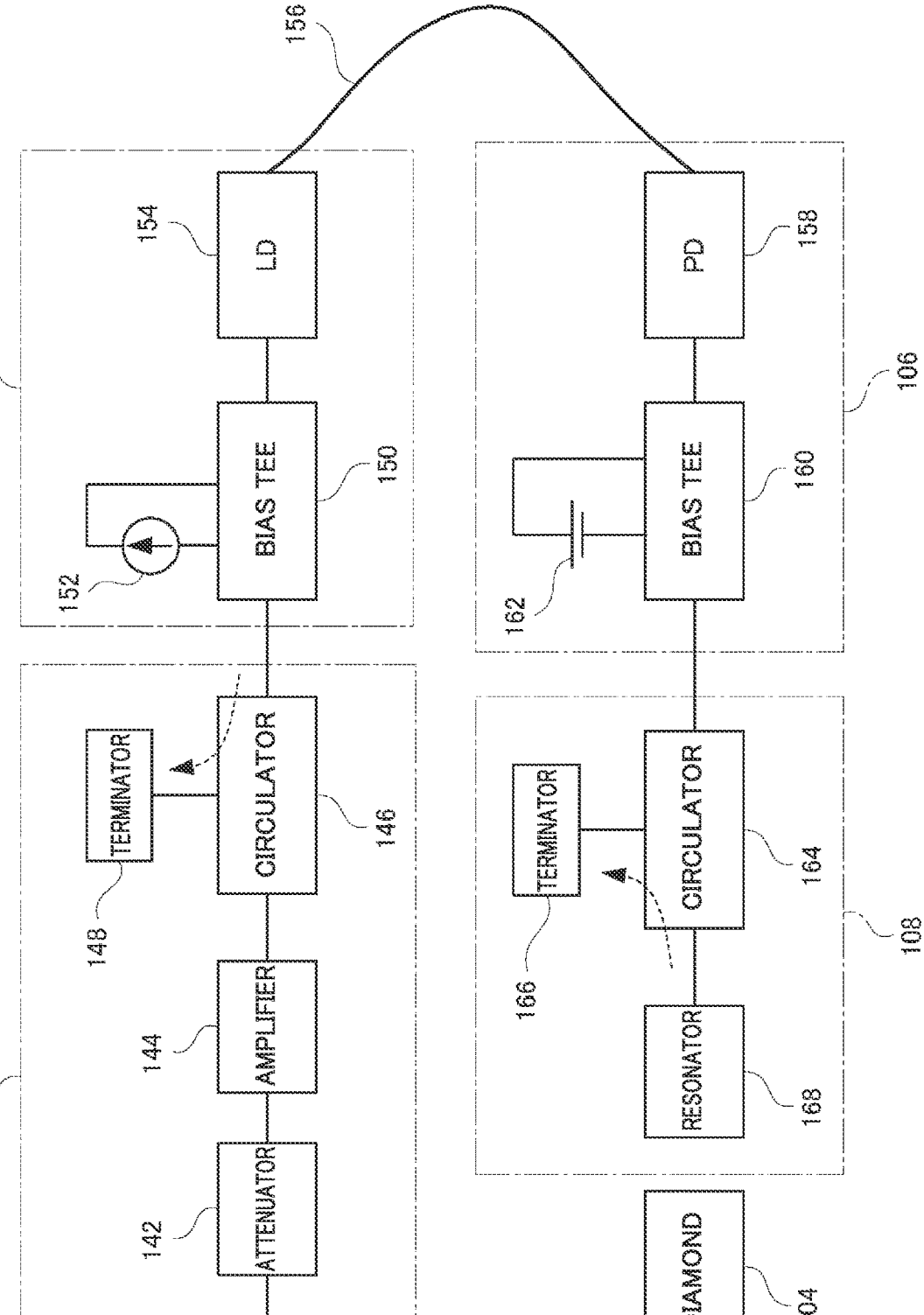
FIG. 3 is a block diagram illustrating a configuration example of an optical feeding unit in the diamond magneto-optical sensor system in FIG. 1.

Optical feeding unit 118 of diamond magneto-optical sensor system 100 will be more specifically described below. Referring to FIG. 3, modulating signal generation unit 110 (see FIG. 1) includes a VCO 140, an attenuator 142, an amplifier 144, a circulator 146, and a terminator 148. Light modulation unit 112 (see FIG. 1) includes a bias tee 150, a current source 152, and an LD (laser diode) 154. Optical fiber 114 (see FIG. 1) includes an optical fiber 156 Photoelectric conversion unit 106 (see FIG. 1) includes a PD (photodiode) 158, a bias tee 160, and a voltage source 162. When it is necessary to amplify a signal photoelectrically converted by photoelectric conversion unit 106, a power amplifier may be included between PD 158 and bias tee 160 or downstream of bias tee 160. Transmission unit 108 (see FIG. 1) includes a circulator 164, a terminator 166, and a resonator 168.

VCO 140 generates an electric signal of a constant frequency and outputs the signal. The constant frequency is included in a microwave frequency band. The output signal of VCO 140 is shaped into a signal of a predetermined level by attenuator 142 and amplifier 144 without changing the frequency. Circulator 146 supplies, to bias tee 150, the signal supplied from amplifier 144. Some signals supplied from circulator 146 to bias tee 150 can be reflected into circulator 146. In order to avoid the influence of the reflection on the output signal of amplifier 144, circulator 146 releases the signal returning from bias tee 150 to terminator 148 as indicated by a broken-line arrow and causes terminator 148 to consume the signal. Terminator 148 is, for example, a 50-Ω terminator.

Bias tee 150 adds, to the signal supplied with the constant frequency from circulator 146, a constant current supplied from current source 152 and then outputs the signal. Current source 152 acts as a constant current source for supplying a driving current (that is, a bias current) of LD 154. LD 154 is driven by the output signal from bias tee 150 and outputs a laser beam. In the output signal from bias tee 150, a constant frequency (that is, a microwave frequency) supplied from circulator 146 is superimposed on a current of a constant level. Thus, the laser beam outputted from LD 154 is amplitude-modulated light (that is, modulated light). In other words, LD 154 is controlled by a direct modulation system and outputs modulated light. The constant frequency (that is, a microwave frequency) supplied from circulator 146 acts as a modulating signal of modulated light that is outputted from bias tee 150.

The modulated light outputted from LD 154 is transmitted to PD 158 through optical fiber 156. PD 158 performs photoelectric conversion on the modulated light inputted from optical fiber 156. Photoelectric conversion by PD 158 requires the application of a reverse bias voltage to PD 158. The reverse bias voltage is supplied from voltage source 162 and is applied to PD 158 through bias tee 160. Voltage source 162 is a power supply, for example, a battery (e.g., a dry battery) that outputs a constant voltage. A photoelectric conversion element for converting light into a potential is preferably used instead of a battery. The photoelectric conversion element may be irradiated with natural light, or a projector may be provided to generate light as will be described later. It is more preferably efficient to irradiate the photoelectric conversion element with part of modulated light or excitation light emitted to the diamond or leaked light of fluorescence radiated from the diamond, as will be described later. In this way, an electrical insulation between the diamond and a light source and a microwave source is obtained by using a battery or a mechanism for generating a potential with light. Although a configuration with a light source is more complicated than a configuration with a battery, the life of diamond magneto-optical sensor system 100 is increased.

PD 158 converts, to an electric signal, the modulated light inputted from optical fiber 156 and outputs the signal to bias tee 160. The electric signal outputted from PD 158 is a signal in which an alternating-current component having the same frequency as the modulation frequency (that is, a microwave frequency) of the modulated light is superimposed on a direct-current component. As described above, the electric signal outputted from PD 158 may be amplified by a power amplifier and inputted to bias tee 160, or the electric signal outputted from bias tee 160 may be power amplified. Power used for the power amplifier is supplied by, for example, a battery. A photoelectric conversion element for converting light into power is preferably used instead of a battery. The photoelectric conversion element may be irradiated with natural light, or a projector may be provided to generate light. It is more preferably efficient to irradiate the photoelectric conversion element with part of modulated light or excitation light emitted to the diamond or leaked light of fluorescence radiated from the diamond. In this way, an electrical insulation between the diamond and the light source and the microwave source is obtained by using a battery or a mechanism for generating power with light, the diamond can be irradiated with microwaves of higher power, and magnetic detection can be performed with higher sensitivity. Although a configuration with a light source is more complicated than a configuration with a battery, the life of diamond magneto-optical sensor system 100 is increased.

Bias tee 160 adds the constant voltage (that is, a reverse bias voltage of PD 158), which is supplied from voltage source 162, to the signal inputted from PD 158 and outputs the signal. In other words, bias tee 160 cuts the direct-current component from the signal inputted from PD 158 and outputs the alternating-current component.

Figure 4:
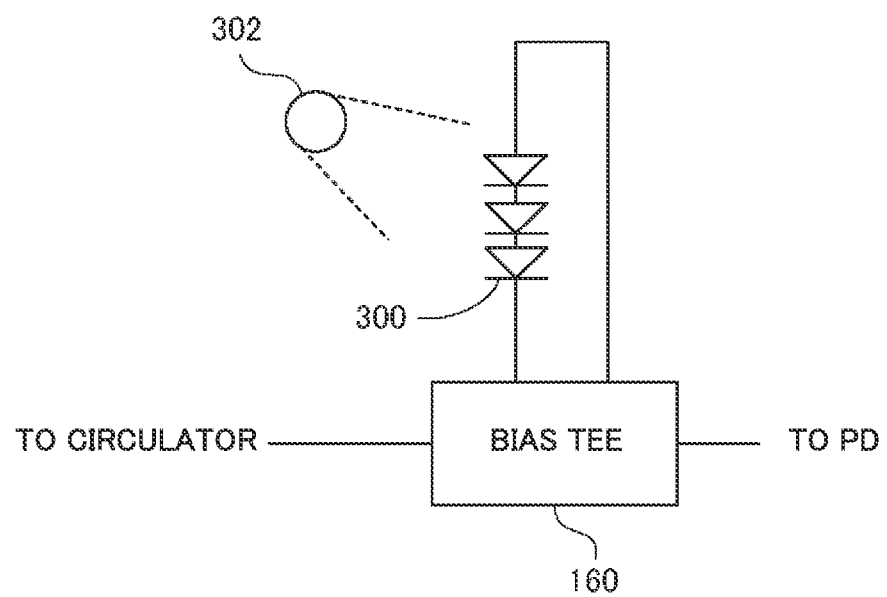
FIG. 4 is a block diagram illustrating an example of a configuration for generating a reverse bias voltage, the configuration being different from FIG. 3.
Figure 5:
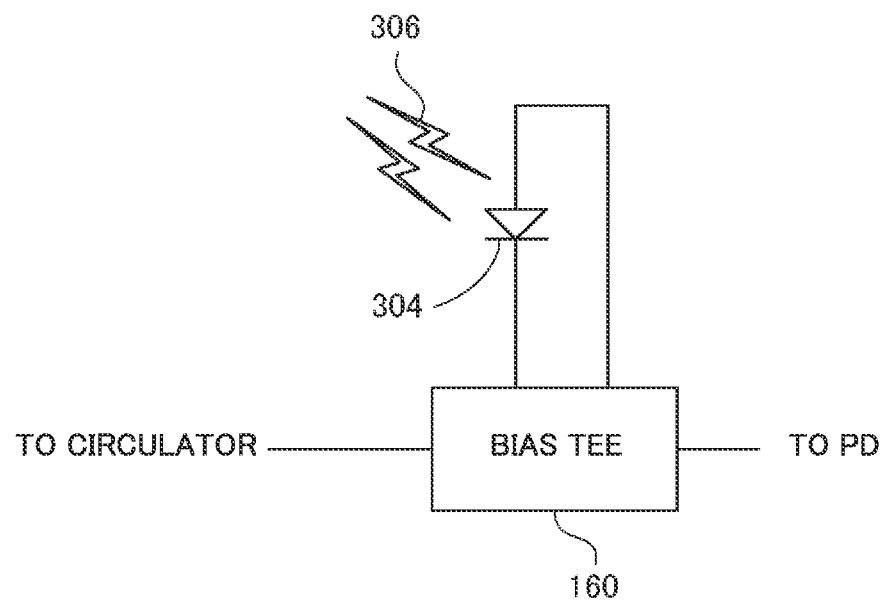
FIG. 5 is a block diagram illustrating an example of a configuration for generating a reverse bias voltage, the configuration being different from FIGS. 3 and 4.

Voltage source 162 for supplying the reverse bias voltage of PD 158 is not limited to the dry battery. The reverse bias voltage may be generated by using a photoelectric conversion element. For example, as illustrated in FIG. 4, voltage source 162 in FIG. 3 may be replaced with a solar battery 300 and a projector 302. Moreover, as illustrated in FIG. 5, voltage source 162 may be replaced with a photodiode 304. FIGS. 4 and 5 illustrate a part including bias tee 160 in the configuration of FIG. 3.

Referring to FIG. 4, solar battery 300 is irradiated with light outputted from projector 302 and generates a direct-current voltage. The light outputted from projector 302 is indicated by broken lines. The generated direct-current voltage is supplied to bias tee 160 as the reverse bias voltage of PD 158. Thus, the direct-current component is cut from the signal inputted to bias tee 160 from PD 158 and only the alternating-current component is outputted. The light emitted to solar battery 300 is not limited to light outputted from projector 302. Natural light may be emitted to solar battery 300. Alternatively, as will be described later, solar battery 300 may be irradiated with part of modulated light or excitation light or leaked light of fluorescence radiated from the diamond.

Referring to FIG. 5, photodiode 304 is irradiated with leaked excitation light 306, which is part of excitation light to be emitted to diamond 104 (see FIG. 3), and generates a direct-current voltage. The generated direct-current voltage is supplied to bias tee 160 as the reverse bias voltage of PD 158. Thus, the direct-current component is cut front the signal inputted to bias tee 160 from PD 158 and only the alternating-current component is outputted. The light emitted to photodiode 304 is not limited to leaked excitation light 306. Natural light may be emitted to photodiode 304. Alternatively, photodiode 304 may be irradiated with part of modulated light that is inputted to PD 158 from optical fiber 156 (see FIG. 3). In this case, an ordinary electronic circuit including a Zener diode needs to be designed to keep a constant output potential of the photodiode. Alternatively, photodiode 304 may be irradiated with part of leaked light of fluorescence radiated from the diamond.

An alternating-current signal (that is, microwaves) outputted from bias tee 160 is inputted to circulator 164. Circulator 164 outputs, to resonator 168, the signal supplied from bias tee 160. Some signals supplied from circulator 164 to resonator 168 can be reflected into circulator 164. In order to avoid the influence of the reflection on the output signal of bias tee 160, circulator 164 releases the signal returning from resonator 168 to terminator 166 as indicated by a broken-line arrow and causes terminator 166 to consume the signal. Terminator 166 is, for example, a 50-Ω terminator.

Figure 6:
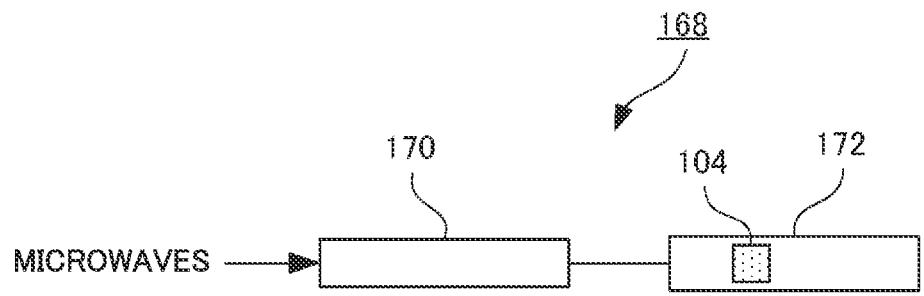
FIG. 6 is a block diagram illustrating a configuration example of a resonator in FIG. 3.

Resonator 168 amplifies supplied microwaves and emits the microwaves to diamond 104. Referring to FIG. 6, resonator 168 includes, for example, an impedance converter 170 and a resonator 172. Diamond 104 is disposed near resonator 172 (including the interior of resonator 172). Impedance converter 170 is, for example, a λ/4 transformer, and resonator 172 is, for example, a λ/4 stub. Resonator 172 is, for example, a stub (that is, a λ/4 open stub) that is formed by two copper wires arranged in parallel as long as one fourth of an electrical length of microwaves and has one open end opposite from the other end connected to impedance converter 170. Resonator 172 may be, for example, a stub (that is, a λ/4 short stub) that is formed by two pieces of copper foil arranged in parallel as long as one fourth of an electrical length of microwaves and has one connected (that is, short) end opposite from the other end connected to impedance converter 170. The impedance converter 170 can reduce or increase the impedance of circulator 164 with respect to resonator 172. Resonator 172 acts as a series resonant circuit or a parallel resonant circuit and amplifies supplied microwaves. Thus, diamond 104 is irradiated with microwaves for producing magnetic resonance on the NV center of diamond 104. Resonator 168 may be a resonator of a microstrip line or a resonator of a coplanar waveguide.

With this configuration, transmission paths for excitation light, microwaves, and fluorescence that are transmitted between the diamond magneto-optical sensor (that is, diamond 104, photoelectric conversion unit 106, and transmission unit 108) and a measuring device (that is, detection unit 128 and control unit 130 or the like) can be all composed of optical fibers 114 and 126 (see FIG. 1) that are nonmetallic members. Thus, in measurement in a high-voltage power unit, electric insulation for avoiding an electrical breakdown can be easily ensured, thereby improving the degree of freedom and flexibility of measurement.

Since electromagnetic waves (that is, microwaves) are not spatially transmitted using an antenna or the like, no restriction is imposed by the Radio Law. Thus, the measurement environment is not limited to the interior of a shield room, and measurement can be conducted in ally environment. Furthermore, the diamond magneto-optical sensor (that is, diamond 104, photoelectric conversion unit 106, and transmission unit 108) can be compact as compared with the wavelength (e.g., about 10 cm) of electromagnetic waves used for measurement and thus can be stored in a rounded case, for example, a spherical case. Thus, in measurement in a high-voltage power unit, concentration of an electric field can be easily avoided.

In the foregoing description, the diamond magneto-optical sensor includes the NV center and microwaves are transmitted by optical feeding. The configuration is not limited thereto. The sensor only needs to use light (that is, modulated light) with light intensity modulated to a frequency of an electromagnetic wave region. Electromagnetic waves are preferably transmitted by optical feeding. It is more preferable that electromagnetic waves in the frequency band of microwaves are transmitted by optical feeding. It is further preferable that electromagnetic waves at a frequency of 1 GHz to 5 GHz are transmitted by optical feeding.

As described above, microwaves are preferably generated from modulated light by PD 158. The configuration is not limited thereto. A device for discharge and conversion or a sensor with an element may be used.

The wavelength of a carrier wave of modulated light is preferably included in the waveband of near infrared light. This facilitates the generation and transmission of the modulated light.

As described above, modulated light is a laser beam outputted from LD 154. Thus, the intensity of the modulated light can be increased, and the modulated light can be transmitted for a longer distance.

As described above, modulated light is light outputted from LD 154 by controlling the driving current of LD 154 such that the driving current changes at a modulation frequency, the driving current being supplied from current source 152. Thus, modulated light can be easily generated by a direct modulation method, thereby downsizing a modulator.

As described above, the driving current of LD 154 is controlled by bias tee 150, the driving current being supplied from current source 152. Thus, modulated light can be easily generated by using LD 154

As described above, excitation light is a laser beam. Thus, excitation light can be easily generated by using excitation light generation unit 120.

As described above, modulated light is transmitted through optical fiber 114 and is received by irradiation unit 116. Thus, modulated light can be reliably transmitted to irradiation unit 116. Moreover, the diamond magneto-optical sensor can be safely used in a high-voltage power unit.

As described above, excitation light is transmitted through optical fiber 126 and is emitted to diamond 104. Thus, excitation light can be reliably transmitted. Moreover, the diamond magneto-optical sensor can be safely used in a high-voltage power unit.

As described above, it is preferable that transmission unit 108 includes resonator 168 and diamond 104 is disposed on resonator 168. This can efficiently irradiate the diamond with electromagnetic waves (that is, microwaves).

Diamond 104 is preferably disposed at a position within 10 mm from PD 158. It is more preferable that diamond 104 is disposed at a position within 5 mm from PD 158. It is further preferable that diamond 104 is disposed at a position within 3 mm from PD 158. Thus, strong electromagnetic waves (that is, microwaves) can be emitted by diamond 104.

As described above, diamond 104, photoelectric conversion unit 106, and transmission unit 108 are preferably stored in conductive case 102 in order to avoid concentration of an electric field. It is preferable that case 102 has openings for drawing optical fiber 114 for transmitting modulated light to photoelectric conversion unit 106 and optical fiber 126 for transmitting excitation light to diamond 104 and is substantially enclosed. The outside shape of case 102 only needs to be smoothly rounded and is preferably shaped like a sphere or an ellipse. Thus, the diamond magneto-optical sensor can be safely used in a high-voltage power unit.

(First Modification)

Figure 7:
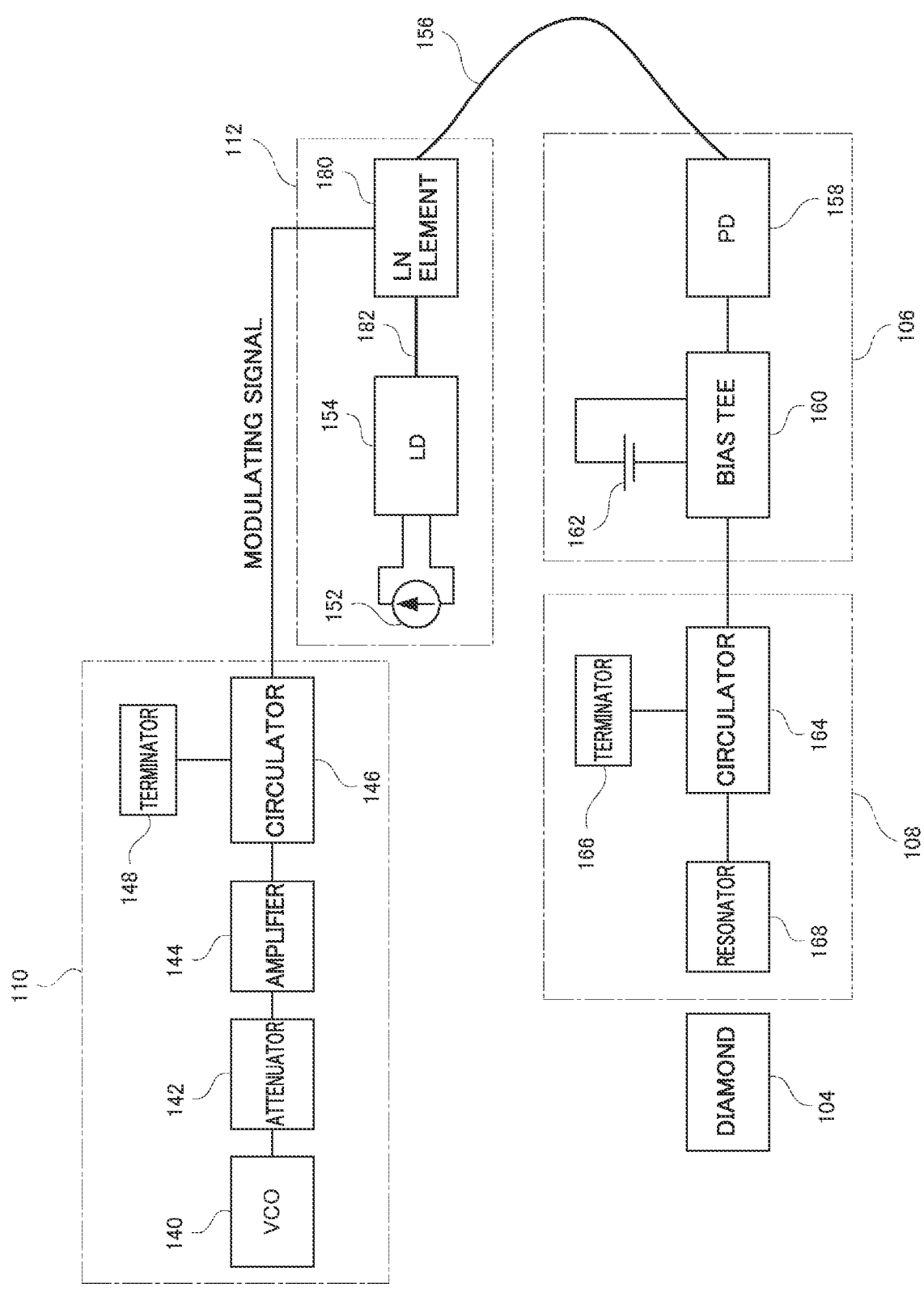
FIG. 7 is a block diagram illustrating the optical feeding unit according to a first modification.

In the foregoing description, modulated light is generated by the direct modulation method. Modulated light may be generated by an external modulation method. Optical feeding unit 118 in FIG. 1 may be configured as illustrated in FIG. 7. The optical feeding unit according to a first modification generates modulated light according to the external modulation method.

The configuration of FIG. 7 is different from that of FIG. 3 only in the configuration of light modulation unit 112. Other configurations of FIG. 7 are identical to those of FIG. 3. Thus, only different points will be mainly described hereinafter without repeating a redundant explanation. Referring to FIG. 7, as described above, an electric signal outputted with a constant frequency from VCO 140 is transmitted to circulator 146 through attenuator 142 and amplifier 144 and is supplied from circulator 146 to an LN element 180. The signal supplied from circulator 146 to LN element ISO is a modulating signal used for generating modulated light as will be described later.

Current source 152 is a constant current source and supplies, to LD 154, a driving current (that is, a bias current) for driving LD 154. LD 154 is driven by the output signal from bias tee 150 and outputs a laser beam with a constant frequency and amplitude. The laser beam outputted from bias tee 150 is inputted to LD 154 through an optical fiber 182. LN element 180 is a light modulator made of lithium niobate (LiNbO$_3$). LN element 180 amplitude-modulates the inputted laser beam by using the signal from circulator 146 as a modulating signal and outputs modulated light. In other words, LN element 180 generates modulated light according to the external modulation method. The modulated light outputted from the LN element 180 is transmitted to PD 158 through optical fiber 156 as described above, is photoelectrically converted into microwaves by PD 158, and is emitted to diamond 104 through resonator 168.

By using the optical feeding unit illustrated in FIG. 7, transmission paths for excitation light, microwaves, and fluorescence that are transmitted between the diamond magneto-optical sensor (that is, diamond 104, photoelectric conversion unit 106, and transmission unit 108) and the measuring device (that is, detection unit 128 and control unit 130 or the like) can be all composed of optical fibers 114 and 126 (see FIG. 1) that are nonmetallic members. Thus, in measurement in a high-voltage power unit, electric insulation for avoiding an electrical breakdown can be easily ensured, thereby improving the degree of freedom and flexibility of measurement. Since electromagnetic waves (that is, microwaves) are not spatially transmitted using an antenna or the like, no restriction is imposed by the Radio Law. Thus, the measurement environment is not limited to the interior of a shield room, and measurement can be conducted in any environment Furthermore, the diamond magneto-optical sensor (that is, diamond 104, photoelectric conversion unit 106, and transmission unit 108) can be compact as compared with the wavelength (e.g., about 10 cm) of electromagnetic waves used for measurement and thus can be stored in a rounded case, for example, a spherical case. Thus, in measurement in a high-voltage power unit, concentration of an electric field can be easily avoided.

Modulated light is generated by using LN element 180 according to the external modulation method, thereby enabling high-speed modulation that generates modulated light at a high modulation frequency (e.g., several tens GHz).

(Second Modification)

Figure 2:
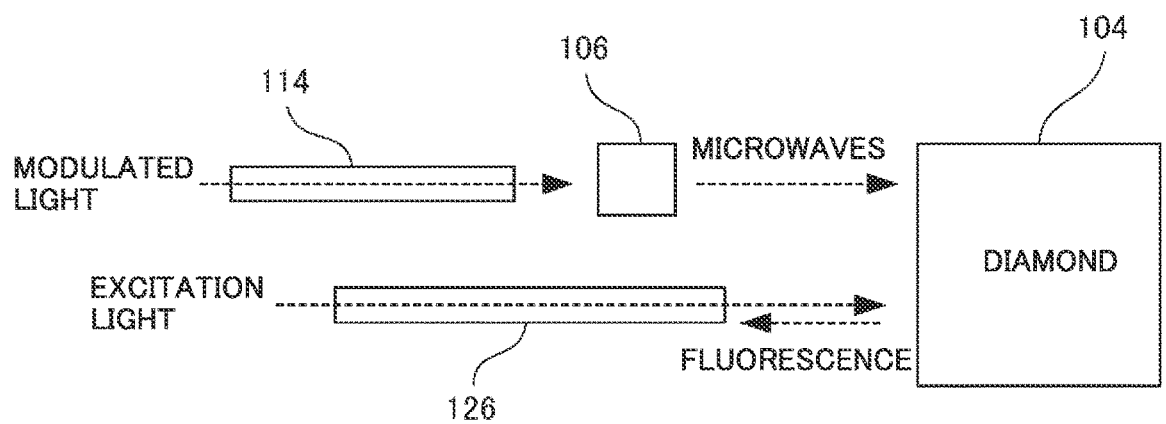
FIG. 2 is a block diagram illustrating transmission paths for microwaves and excitation light that are emitted to a diamond.

In the foregoing description, as illustrated in FIG. 2, modulated light and excitation light for optical feeding are transmitted close to diamond 104 through the different optical fibers (that is, optical fibers 114 and 126). The configuration is not limited thereto. In a diamond magneto-optical sensor system according to a second modification, modulated light and excitation light for optical feeding are transmitted through the same optical fiber.

Figure 8:
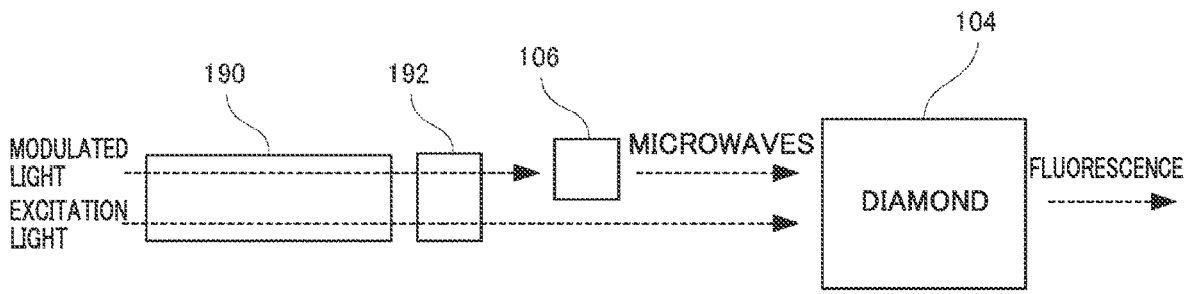
FIG. 8 is a block diagram illustrating transmission paths for microwaves and excitation light that are emitted to the diamond in the diamond magneto-optical sensor system according to a second modification.

Referring to FIG. 8, modulated light outputted from light modulation unit 112 (see FIG. 1) and excitation light outputted from excitation light generation unit 120 are both transmitted through an optical fiber 190. The carrier frequency of modulated light is different from that of excitation light. The modulated light outputted from the output end of optical fiber 190 is inputted to photoelectric conversion unit 106 and is photoelectrically converted to generate microwaves as described above. The generated microwaves are emitted to diamond 104. The excitation light outputted from the output end of optical fiber 190 is emitted as it is to diamond 104. Fluorescence radiated from diamond 104 may be transmitted to detection unit 128 through another optical fiber or may be transmitted to detection unit 128 through a branching filter 192. In this way, the carrier wave of modulated light has a different wavelength from excitation light, so that modulated light and excitation light can be easily transmitted through the same optical fiber and the number of components can be reduced.

If modulated light and excitation light are inputted to optical fiber 190, optical elements may be disposed such that optical paths for modulated light and excitation light overlap each other on the input end of optical fiber 190. For example, in the case of the carrier wave of modulated light and excitation light with different frequencies (that is, different wavelengths), a dichroic mirror can be used. For example, modulated light can enter optical fiber 190 through the dichroic mirror while excitation light can be reelected by the dichroic mirror into optical fiber 190.

(Third Modification)

In the foregoing description, as illustrated in FIG. 8, modulated light and excitation light with different frequencies (that is, different wavelengths) are transmitted close to diamond 104 through same optical fiber 190. The configuration is not limited thereto. In a diamond magneto-optical sensor system according to a third modification, modulated light and excitation light with the same frequency (that is, the same wavelength) are transmitted through the same optical fiber.

Figure 9:
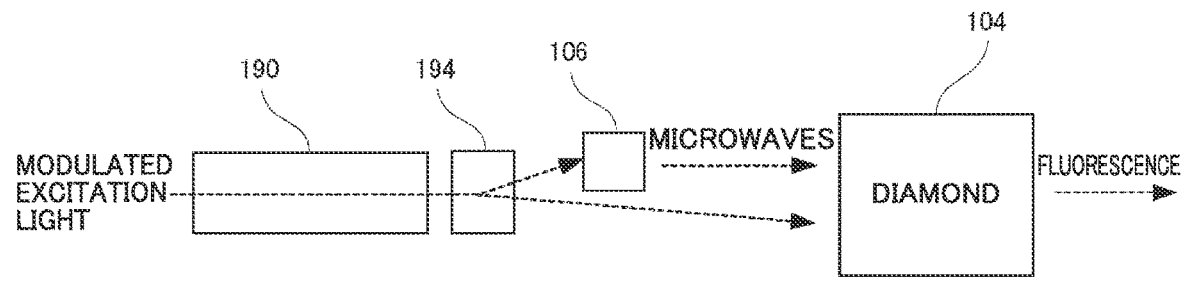
FIG. 9 is a block diagram illustrating transmission paths for microwaves and excitation light that are emitted to the diamond in the diamond magneto-optical sensor system according to a third modification.

Referring to FIG. 9, modulated excitation light is transmitted through optical fiber 190. The modulated excitation light is generated by amplitude-modulating the excitation light of the NV center by using a signal at a microwave frequency as a modulating signal. The carrier frequency of the modulated excitation light is the same as the frequency of excitation light. The modulated excitation light that are outputted from the output end of optical fiber 190 are split into two optical paths by a splitter 194. Light of the first optical path is inputted to photoelectric conversion unit 106 and is photoelectrically converted to generate microwaves as described above. The generated microwaves are emitted to diamond 104. Light of the second optical path is emitted as excitation light to diamond 104 without being converted.

Modulated excitation light to be incident on optical fiber 190 can be generated by externally modulating excitation light, which is outputted from excitation light generation unit 120 (FIG. 1), by using the LN element 180 as illustrated in FIG. 7. Modulation of excitation light eliminates the need for providing an LD (LD 154 illustrated in FIGS. 3 and 7) for generating modulated light, thereby facilitating manufacturing with a smaller number of components.

(Fourth Modification)

In the foregoing description, microwaves are generated by photoelectrically converting modulated light by photoelectric conversion unit 106. The configuration is not limited thereto. In a diamond magneto-optical sensor system according to a fourth modification, modulated light is directly emitted to diamond 104.

Figure 10:
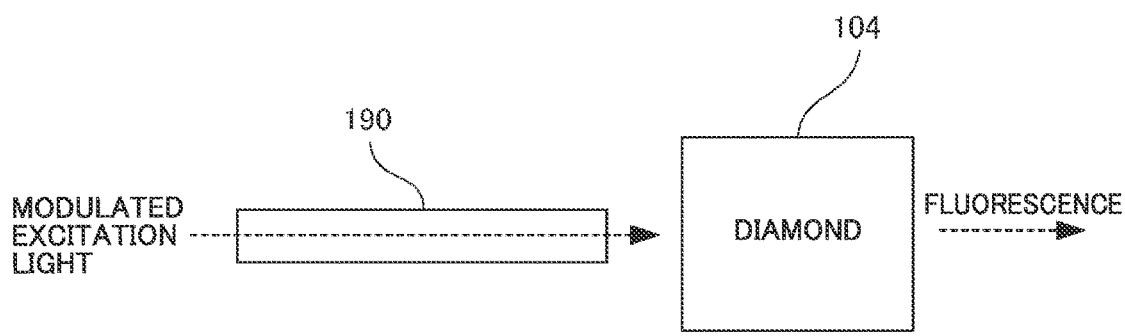
FIG. 10 is a block diagram illustrating transmission paths for microwaves and excitation light that are emitted to the diamond in the diamond magneto-optical sensor system according to a fourth modification.

Referring to FIG. 10, modulated excitation light is transmitted through optical fiber 190 as in FIG. 9. The modulated excitation light is generated by amplitude-modulating the excitation light of the NV center by using a signal at a microwave frequency as a modulating signal. The modulated light and excitation light that are outputted from the output end of optical fiber 190 are directly emitted to diamond 104. In other words, the modulated excitation light is used as the excitation light of the NV center and microwaves for magnetic resonance. This eliminates the need for photoelectric conversion unit 106 for photoelectric conversion, thereby facilitating manufacturing with a smaller number of components.

In the foregoing, description, the diamond magneto-optical sensor includes the NV center. The configuration is not limited thereto. The diamond magneto-optical sensor only needs to include a color center with an electronic spin. The color center with the electronic spin is a center that forms a spin triplet state and is illuminated by excitation. A typical example is an NV center. Additionally, it is known that a color center with an electronic spin is also present in a silicon-vacancy center (that is, Si—V center), a germanium-vacancy center (that is, Ge—V center), and a tin-vacancy center (that is, Sn—V center). Thus, the diamond magneto-optical sensor may be formed by using diamonds including such centers instead of a diamond including an NV center.

In the foregoing description, modulated light is transmitted close to the diamond through the optical fiber. The configuration is not limited thereto. Modulated light may be spatially transmitted by using a lens or a mirror instead of the optical fiber.

Example 1

Figure 11:
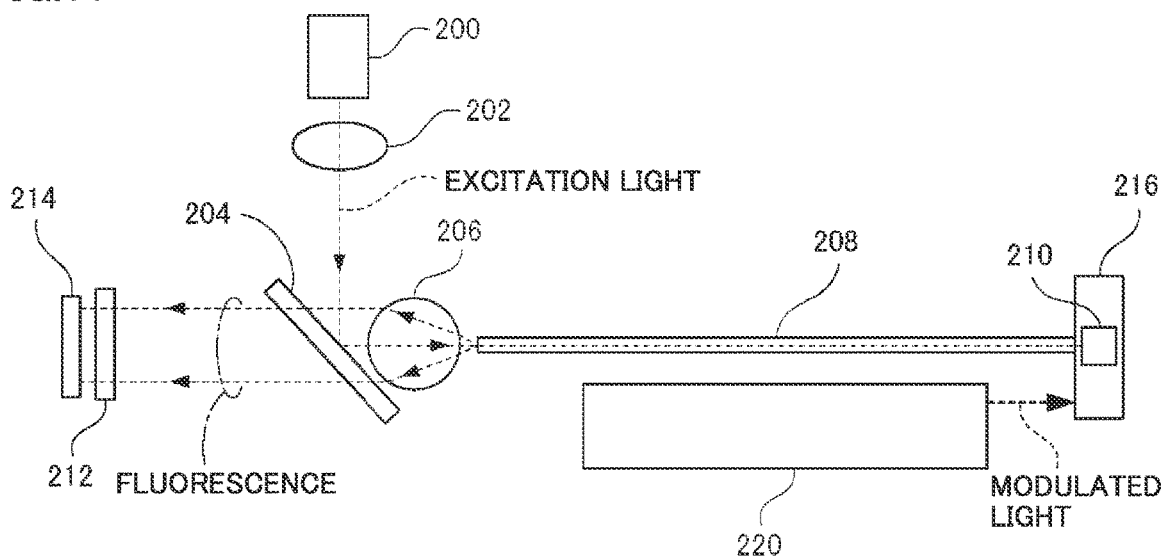
FIG. 11 is a schematic diagram illustrating the configuration of a measuring device used for experiments.

The effectiveness of the present disclosure will be described below according to examples By using a measuring device configured as illustrated in FIG. 11, the diamond including the NV center was irradiated with microwaves and excitation light, and the intensity of fluorescence radiated from the NV center was measured. Referring to FIG. 11, from among measuring devices, a diamond magneto-optical sensor 216 was composed of diamond 104, photoelectric conversion unit 106, and transmission unit 108 that are illustrated in FIG. 3. In FIG. 1I, diamond 104 of FIG. 3 was replaced with a diamond 210. For a microwave supply source 220 (that is, a microwave system) for emitting microwaves to diamond 210, modulating signal generation unit 110, light modulation unit 112, and optical fiber 156 in FIG. 3 were used, and modulated light was transmitted to diamond magneto-optical sensor 216. A configuration for irradiating diamond 210 included in a diamond magneto-optical sensor 216 with excitation light (that is, an irradiation system) includes a light source 200, a collimate lens 202, a dichroic mirror 204, a sphere lens 206, and an optical fiber 208. A configuration for observing fluorescence radiated from diamond 210 (that is, an observation system) includes optical fiber 208, sphere lens 206, dichroic mirror 204, an LPF (Long Pass Filter) 212, and a photodetector 214.

Referring to FIG. 3, an electric signal with a predetermined frequency of 3 dBm was outputted from VCO 140. The predetermined frequency was changed in a range of 2.7 GHz to 2.94 GHz. The output signal of VCO 140 was attenuated by −20 dB by attenuator 142, was amplified by +40 dB by amplifier 144, and was inputted to circulator 146. For LD 154, LPSC-1550-FC of Thorlabs, Inc. was used. A bias current of 130 mA was outputted from current source 152 and was supplied to LD 154 through bias tee 150, and then modulated light was generated by the direct modulation method. Modulated light including a direct-current component of 15 mW and an alternating-current component of 10 mWrms (rms value) was transmitted to diamond magneto-optical sensor 216 through the optical fiber 156. For PD 158 constituting diamond magneto-optical sensor 216, FGA01FC of Thorlabs, Inc. was used. For voltage source 162, a dry battery was used. A reverse bias voltage of 9 V was outputted from voltage source 162 and was supplied to PD 158 through bias tee 160, and then an electric signal of microwaves was generated by photoelectric conversion. The generated microwaves were transmitted to resonator 168 through circulator 164 having a characteristic impedance of 50Ω For resonator 168, a resonator of a λ/4 transformer and a λ/4 open stub was used.

As a comparative example, microwaves generated by a microwave generator (not illustrated) instead of microwave supply source 220 were transmitted by using a coaxial cable having a characteristic impedance of 50Ω and were emitted to diamond 210 through the resonator of a coplanar waveguide. The frequency of microwaves transmitted through the coaxial cable was also changed in a range of 2.74 GHz to 2.94 GHz For light source 200 for generating excitation light, an LD (laser diode) element (specifically, L515A1 of Thorlabs, Inc.) was used, and a green laser beam (that is, excitation light) of 5 mW was generated Excitation light outputted from light source 200 was condensed through collimate lens 202 and then was emitted to dichroic mirror 204. For collimate lens 202, LA1116-A of Thorlabs, Inc. was used. For dichroic mirror 204, SO6-RG of SURUGA SEIKI Co., Ltd. was used. Excitation light (that is, green light) incident on dichroic mirror 204 is reflected by dichroic mirror 204. The reflected light was condensed through sphere lens 206, was caused to enter optical fiber 208 (specifically, the core), was transmitted through optical fiber 208, and then was radiated to diamond 210. For sphere lens 206, MS-08-4.35P1 (8 mm in diameter) of OptoSigma Corporation was used. For optical fiber 208, an optical digital cable having a core diameter φ of 0.9 mm was used.

In fluorescence radiated from diamond 210, fluorescence having entered optical fiber 208 was propagated through optical fiber 208, was transformed into parallel rays through sphere lens 206, and then was emitted to dichroic mirror 204. Fluorescence (that is, red light) incident on dichroic mirror 204 passes through dichroic mirror 204 and enters LPF 212. Fluorescence having passed through LPF 212 was detected by photodetector 214. LPF 212 allows the passage of light at a predetermined wavelength or more and cuts (e.g., reflects) light at a wavelength shorter than the predetermined wavelength. For LPF 212, LOPF-25C-593 of OptoSigma Corporation was used. For photodetector 214, a photodiode (specifically, S6967 of Hamamatsu Photonics K. K.) was used. Radiated light of diamond is red light passing through LPF 212, whereas excitation light having a shorter wavelength than red light does not pass through LPF 212. Thus, excitation light radiated from light source 200 was detected as noise by photodetector 214, thereby suppressing a reduction in the sensitivity of detection.

Figure 12:
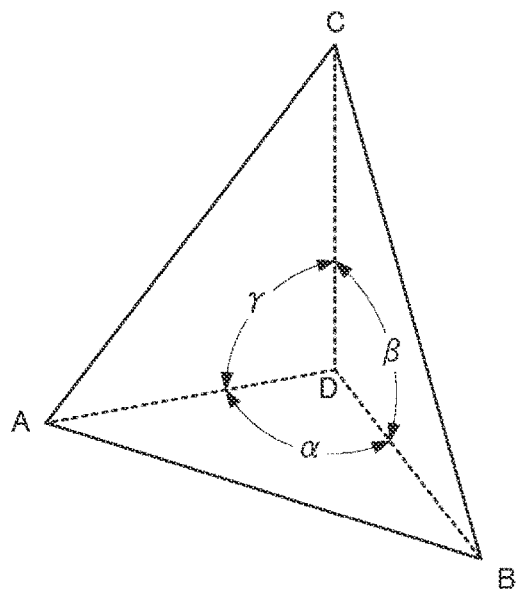
FIG. 12 is a perspective view illustrating the shape of the diamond used for experiments.

A diamond of type 1b was used as diamond 210. Electrons were injected into the diamond with an electron acceleration energy of 3 MeV and an electron dose of $3 \times 10^{18}/cm^2$, and then the diamond was annealed at 800° C.' for about one hour, so that the diamond including an NV center was generated. As illustrated in FIG. 12, the diamond was cut into a corner cube with an oblique side of 1 mm to produce diamond 210. The diamond in FIG. 12 is a triangular pyramid having points A, B. C, and D as apexes and angles α, β, and γ as right angles Excitation light (that is, green light) is emitted from optical fiber 208 described above in a direction perpendicular to the plane of a triangle ABC. The excitation light having entered the diamond is internally reflected by three planes (that is, triangles ABD, BCD, and ACD) acting as reflecting surfaces. This is because the diamond has a refractive index of about 2.5. The excitation light then passes through an optical path longer than that of unreflected light and is emitted to the NV center. Fluorescence (that is, red light) radiated from the NV center is internally reflected by the three planes acting as reflecting surfaces, is outputted from the plane of the triangle ABC where the excitation light is incident, and is emitted to optical fiber 208 described above.

Figure 13:
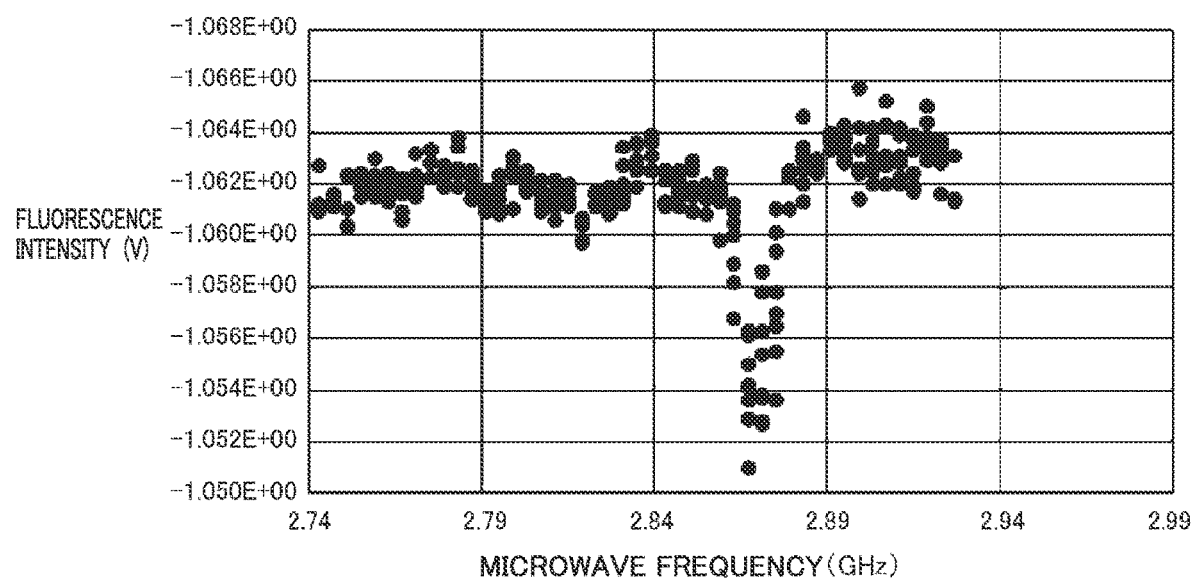
FIG. 13 is a graph showing the results of experiments in which microwaves are transmitted by optical feeding.
Figure 14:
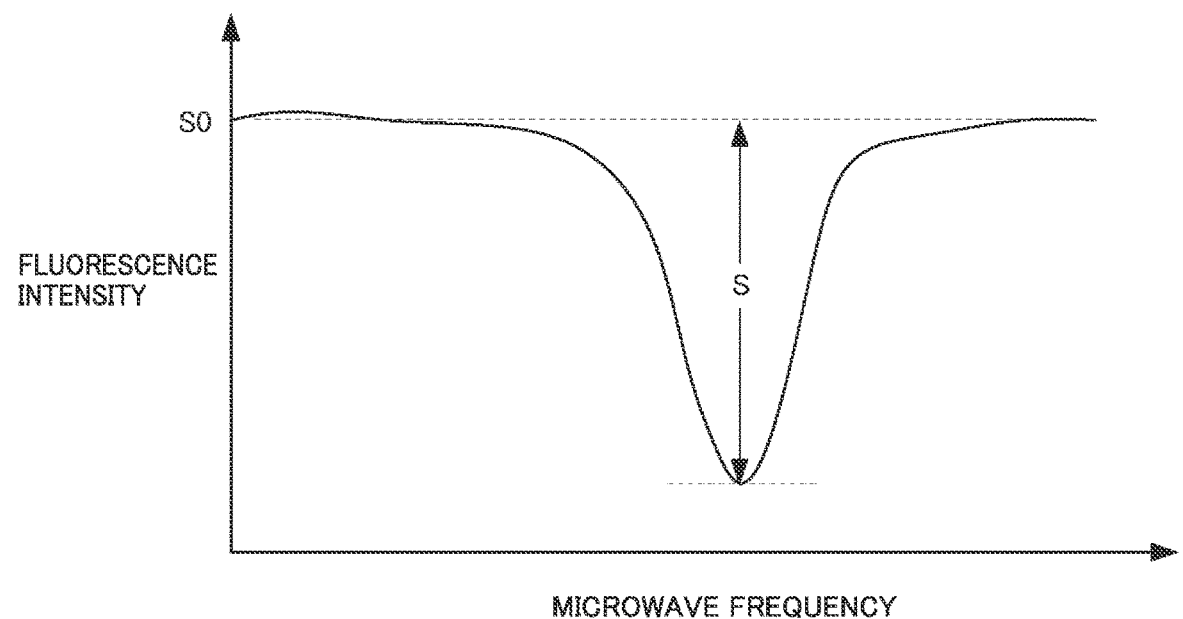
FIG. 14 is a graph showing fluctuations in the intensity of fluorescence radiated from the NV center of the diamond.

As described above, microwaves optically fed using microwave supply source 220 were emitted to diamond 210, and then fluorescence radiated from diamond 210 was measured. The results of measurement were shown in FIG. 13. In FIG. 13, the horizontal axis indicates a frequency of a microwave (that is, a frequency of VCO 140) emitted to diamond 210 and the vertical axis indicates fluorescence intensity measured by photodetector 214 The frequency of microwaves was changed with the constant power of microwaves, so that a valley of the intensity of red fluorescence (that is, red light brightness) radiated from the NV center of the diamond was observed. Thus, a spin detection contrast ratio as a decrease rate of red light brightness (that is, a value determined by dividing a valley depth S of the graph in FIG. 14 by fluorescence intensity S0) can be calculated. As a theoretical formula of sensitivity δβ (that is, the resolution of a detected magnetic field B) of the diamond magneto-optical sensor, Formula 1 expressed below is known. The spin detection contrast ratio affects the sensitivity δβ.

$$\delta B \sim \frac{1}{\gamma \sqrt{\eta}} \frac{1}{C} \frac{1}{\sqrt{NT_2}} (T/\sqrt{Hz}) \qquad \text{[Formula 1]}$$

In Formula 1, γ is a gyromagnetic ratio (that is, a constant) that is a value close to the gyromagnetic ratio of an electron (that is, $1.76 \times 10^{11}$ rad/s/T). η is the detection efficiency of fluorescence, and C is a spin detection contrast ratio. N is the number of NV centers that are irradiated with excitation light and carry negative electrical charge in an area where fluorescence is condensed. $T_2$ is a transverse relaxation time of an electronic spin. According to the theoretical formula of sensitivity (Formula 1), the sensitivity δβ decreases as the spin detection contrast ratio increases, resulting in higher sensitivity.

According to the measurement results of FIG. 13, fluorescence intensity of 1 μA and a spin detection contrast ratio of about 1.3% were obtained. Since microwave supply source 220 includes circulators 146 and 164, fluctuations in the base line of fluorescence intensity are suppressed to about ±0.1% in the measurement results of FIG. 13.

Figure 15:
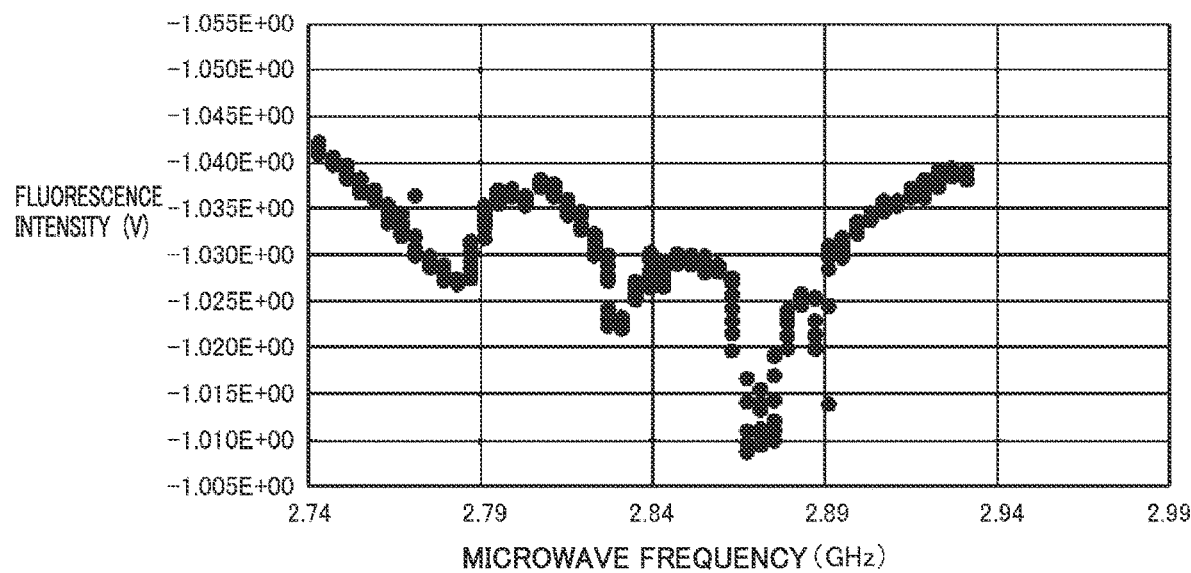
FIG. 15 is a graph showing the results of experiments in which microwaves are transmitted through a coaxial cable.

As a comparative example, microwaves were transmitted through the coaxial cable and were emitted to diamond 210, and then fluorescence radiated from diamond 210 was measured. The measurement results are shown in FIG. 15. In FIG. 15, the horizontal axis indicates a frequency of a microwave emitted to diamond 210 and the vertical axis indicates fluorescence intensity measured by photodetector 214. The frequency of microwaves was changed with the constant power of microwaves, so that a valley of the intensity of red fluorescence (that is, red light brightness) radiated from the NV center of the diamond was observed, and fluorescence intensity of 1 μA and a spin detection contrast ratio of about 2% were obtained. Since microwaves were transmitted through the coaxial cable without a circulator, fluctuations in the base line of fluorescence intensity are about ±1% in the measurement results of FIG. 15.

In a comparison between the measurement results of FIGS. 13 and 15, by transmitting microwaves by optical feeding, the same fluorescence intensity was obtained as in the transmission of microwaves through a coaxial cable. Also for a spin detection contrast ratio, the same value was obtained. Thus, optical feeding of microwaves is effective in magnetic detection using the NV center of the diamond, and the effectiveness of the diamond magneto-optical sensor configured for optical feeding is proved.

Example 2

As in Example 1, the measuring device configured as in FIG. 11 was used, diamond 210 having the NV center was irradiated with microwaves and excitation light by using microwave supply source 220 different from that of Example 1, and the intensity of fluorescence radiated from the NV center was measured. Specifically, microwave supply source 220 was configured according to an external modulation system in which an external electrical modulating signal is inputted using the LN element as illustrated in FIG. 7 and modulated light is formed. Other parts were used in the same experimental configuration as Example 1. With this configuration, modulated light could be generated using the LN element. The modulated light having passed through the optical fiber could be converted into microwaves by the PD and the bias tee and emitted to the diamond By changing the frequency of microwaves, a spectrum where the intensity of fluorescence decreases at a resonance frequency was obtained as in FIG. 13. The frequency position of the dip of the spectrum shifted depending upon the intensity of a magnetic field. It was confirmed that the magnetic field was detectable.

Example 3

As in Example 1, the measuring device configured as in FIG. 11 was used, diamond 210 having the NV center was irradiated with microwaves and excitation light by changing a component part of optical transmission through the optical fiber in microwave supply source 220, and the intensity of fluorescence radiated from the NV center was measured. Specifically, as illustrated in FIG. 8, modulated light and excitation light were multiplexed and entered and transmitted into the same optical fiber. The light was split again by the splitter on the emission side, and microwaves were generated from the split modulated light by the PD and the bias tee in the photoelectric conversion unit and were radiated to the diamond. The frequency of modulated light was controlled to change the frequency of microwaves, so that a spectrum where the intensity of fluorescence decreases at a resonance frequency was obtained as in FIG. 13. The frequency position of the dip of the spectrum shifted depending upon the intensity of a magnetic field. It was confirmed that the magnetic field was detectable.

Example 4

As in Example 1, the measuring device configured as in FIG. 11 was used, diamond 210 having the NV center was irradiated with microwaves and excitation light by changing the configuration of microwave supply source 220, and the intensity of fluorescence radiated from the NV center was measured. Specifically, a power amplifier (amplifier) was installed downstream of a PD (corresponding to PD 158 of FIG. 3) in a photoelectric conversion unit (corresponding to photoelectric conversion unit 106 of FIG. 3), and modulated light was converted into an electric signal to amplify power. Thereafter, a high-frequency component and a direct-current component were separated by a bias tee (corresponding to bias tee 160 of FIG. 3). The high-frequency component was emitted to diamond 210. For the power of the power amplifier, the direct-current component separated by the bias tee was used. By changing the frequency of modulated light to change the frequency of microwaves, a spectrum where the intensity of fluorescence decreases at a resonance frequency was obtained as in FIG. 13. The frequency position of the dip of the spectrum shifted depending upon the intensity of a magnetic field. It was confirmed that the magnetic field was detectable.

Example 5

As in Example 1, the measuring device configured as in FIG. 11 was used, a solar battery rated at 5 V with power of 2 W was used (see FIG. 4) for voltage source 162 instead of a dry battery (9 V), diamond 210 having the NV center was irradiated with microwaves and excitation light, and the intensity of fluorescence radiated from the NV center was measured. Light was emitted to the solar battery by using a projector. By changing the frequency of modulated light to change the frequency of microwaves, a spectrum where the intensity of fluorescence decreases at a resonance frequency was obtained as in FIG. 13. The frequency position of the dip of the spectrum shifted depending upon the intensity of a magnetic field. It was confirmed that the magnetic field was detectable.

The present disclosure was described according to the description of the embodiment. The embodiment was merely exemplary and the present disclosure is not limited to the embodiment. The scope of the present disclosure is indicated by the claims in consideration of the detailed description of the invention. The scope (lithe present disclosure includes meanings equivalent to the language of the claims and all changes in the scope.

REFERENCE SIGNS LIST

100 Diamond magneto-optical sensor system
102 Case
104, 210 Diamond
106 Photoelectric conversion unit
108 Transmission unit
110 Modulating signal generation unit
112 Light modulation unit
114, 126, 156, 182, 190, 208 Optical fiber
116 Irradiation unit
118 Optical feeding unit
120 Excitation light generation unit
122, 192 Branching filter
124 Condensing unit
128 Detection unit
130 Control unit
140 VCO
142 Attenuator
144 Amplifier
146, 164 Circulator
148, 166 Terminator
150, 160 Bias tee
152 Current source
154 LD
158 PD
162 Voltage source
168 Resonator
170 Impedance converter
172 Resonator
180 LN element
194 Splitter
200 Light source
202 Collimate lens
204 Dichroic mirror
206 Sphere lens
212 LPF
214 Photodetector
216 Diamond magneto-optical sensor
220 Microwave supply source
300 Solar battery
302 Projector
304 Photodiode
306 Leaked excitation light
A, B, C, D Point
α, β, γ Ankle

The invention claimed is:

1. A diamond magneto-optical sensor comprising:
a diamond that includes a color center with an electronic spin and is irradiated with excitation light; and
an irradiation unit configured to irradiates the diamond with electromagnetic waves for magnetic resonance,
wherein the irradiation unit is further configured to receive amplitude-modulated light, the amplitude-modulated light including light having been subjected to amplitude modulation,
the irradiation unit further includes a photoelectric conversion unit configured to convert the amplitude-modulated light into an electric signal,
the electromagnetic waves for magnetic resonance are formed by the electric signal generated by the photoelectric conversion unit and are emitted to the diamond, and
a modulation frequency used to generate the amplitude-modulated light is included in a microwave frequency band.

2. The diamond magneto-optical sensor according to claim 1, wherein the photoelectric conversion unit includes a photodiode that converts the amplitude-modulated light into the electric signal,
the irradiation unit further includes a first bias tee that extracts an alternating-current component from the electric signal generated by the photodiode, and
the electromagnetic waves for magnetic resonance are formed by the alternating-current component.

3. The diamond magneto-optical sensor according to claim 2, wherein the photoelectric conversion unit includes a photoelectric conversion element that converts part of light including at least one of projector light, amplitude-modulated light, and excitation light into a potential, and
the first bias tee extracts the alternating-current component from the electric signal by application of the potential generated by the photoelectric conversion element.

4. The diamond magneto-optical sensor according to claim 3, wherein the photoelectric conversion unit includes:
a photoelectric conversion element that converts part of light including at least one of projector light, amplitude-modulated light, and excitation light into power, and
an amplifier that amplifies an output signal of the photodiode or the first bias tee, and
the output signal is amplified by applying the power generated by the photoelectric conversion element to the amplifier.

5. The diamond magneto-optical sensor according to claim 1, wherein a carrier wave of the amplitude-modulated light has a wavelength different from a wavelength of the excitation light.

6. The diamond magneto-optical sensor according to claim 1, wherein a carrier wave of the amplitude-modulated light has a wavelength included in a waveband of near infrared light.

7. The diamond magneto-optical sensor according to claim 1, wherein the excitation light has the same wavelength as a carrier wave of the amplitude-modulated light, and
the amplitude-modulated light is generated by amplitude-modulating the excitation light.

8. The diamond magneto-optical sensor according to claim 1, wherein the amplitude-modulated light is a laser beam.

9. The diamond magneto-optical sensor according to claim 1, wherein the amplitude-modulated light is outputted from a laser diode by controlling a driving current of the laser diode such that the driving current changes at a modulation frequency.

10. The diamond magneto-optical sensor according to claim 1, wherein the amplitude-modulated light is outputted from an LN element by controlling the LN element by a modulating signal of the modulation frequency, the LN element receiving a laser beam.

11. The diamond magneto-optical sensor according to claim 9, wherein the driving current of the laser diode is controlled by a second bias tee.

12. The diamond magneto-optical sensor according to claim 1, wherein the excitation light is a laser beam.

13. The diamond magneto-optical sensor according to claim 1, wherein the amplitude-modulated light is transmitted through a first optical fiber and received by the irradiation unit.

14. The diamond magneto-optical sensor according to claim 13, wherein the excitation light is transmitted through a second optical fiber and emitted to the diamond.

15. The diamond magneto-optical sensor according to claim 13, wherein the excitation light is transmitted through the first optical fiber and emitted to the diamond.

16. The diamond magneto-optical sensor according to claim 1, wherein the irradiation unit includes a resonator, and the diamond is disposed on the resonator.

17. The diamond magneto-optical sensor according to claim 1, wherein the diamond is disposed at a position within 5 mm from the photoelectric conversion unit.

18. The diamond magneto-optical sensor according to claim 1, wherein the irradiation unit irradiates the diamond with the inputted amplitude-modulated light as the electromagnetic waves for magnetic resonance.

19. The diamond magneto-optical sensor according to claim 1, further comprising a storage part formed by a conductive member, and
the diamond and the irradiation unit are stored in the storage part.

20. A diamond magneto-optical sensor system comprising:
the diamond magneto-optical sensor according to claim 1,
a light modulation unit that generates the amplitude-modulated light, and
a transmission unit that transmits the amplitude-modulated light,
wherein the amplitude-modulated light is transmitted through the transmission unit and is received by the irradiation unit.

21. A diamond magneto-optical sensor comprising:
a diamond that includes a color center with an electronic spin and is irradiated with excitation light; and
an irradiation unit configured to irradiate the diamond with electromagnetic waves for magnetic resonance,
wherein the irradiation unit is further configured to receive amplitude-modulated light, the amplitude-modulated light including light having been subjected to amplitude modulation,
the excitation light has the same wavelength as a carrier wave of the amplitude-modulated light,
the amplitude-modulated light is generated by amplitude-modulating the excitation light, and
a modulation frequency used to generate the amplitude-modulated light is included in a microwave frequency band.

* * * * *